United States Patent [19]

Abraham et al.

[11] Patent Number: 4,994,527

[45] Date of Patent: Feb. 19, 1991

[54] HIGH TEMPERATURE, OIL-RESISTANT ELASTOMERS FROM HYDROGENATED COPOLYMERS OF 1,3-DIENES CONTAINING FLUORINE

[75] Inventors: Tonson Abraham, Elyria; Gary R. Cornell, Parma, both of Ohio

[73] Assignee: The B. F. Goodrich Company, Akron, Ohio

[21] Appl. No.: 450,950

[22] Filed: Dec. 14, 1989

[51] Int. Cl.$^5$ .............................................. C08F 8/04
[52] U.S. Cl. ................................ 525/326.2; 525/338; 525/339
[58] Field of Search ...................... 525/338, 339, 326.2

[56] References Cited

U.S. PATENT DOCUMENTS

| | | |
|---|---|---|
| 2,836,583 | 5/1958 | Crawford . |
| 2,951,063 | 8/1960 | Bolstad et al. . |
| 2,951,064 | 8/1960 | Lo et al. . |
| 2,951,065 | 8/1960 | Lo et al. . |
| 2,975,164 | 3/1961 | Crawford et al. . |
| 3,308,175 | 3/1967 | Barr . |
| 3,379,773 | 4/1968 | Barr . |
| 3,398,128 | 8/1968 | Bolstad et al. . |
| 3,416,899 | 12/1968 | Schift ................................ 252/8.551 |
| 3,562,341 | 2/1971 | Tarrant et al. . |
| 3,607,850 | 9/1971 | Smith . |
| 4,098,991 | 7/1978 | Kang .................................. 525/339 |

*Primary Examiner*—Bernard Lipman
*Attorney, Agent, or Firm*—Daniel J. Hudak; David P. Dureska; William A. Skinner

[57] ABSTRACT

A copolymer is formed by emulsion polymerization and then hydrogenated to obtain a thermooxidatively stable composition. The copolymer is prepared from two monomer classes. The first monomeric class comprises a fluorodiene of the structure

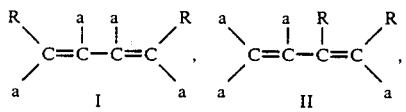

-continued

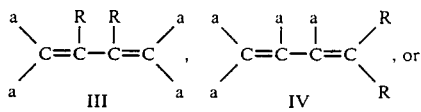

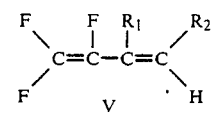

wherein substituent a is independently hydrogen or fluorine, R is hydrogen or a fluoro alkyl group containing from 1 to about 4 carbon atoms and containing at least three fluoro atoms, with the proviso that both R's are not hydrogen, $R_1$ and $R_2$ are independently fluorine, hydrogen or a fluoro alkyl group containing from 1 to about 4 carbon atoms and containing at least three fluorine atoms.

The second monomeric class is (a) a hydrocarbon diene comprising a conjugated diene, a branched conjugated diene or mixtures thereof containing from 4 to about 8 carbon atoms or a mixture of (a) with (b) a monomer of the general formula $CH_2=CR_3X$ wherein $R_3$ is hydrogen or an alkyl group containing from 1 to 4 carbon atoms, and X is 2-pyridyl, 4-pyridyl, —COOR$_4$, CONR$_5$R$_6$ or —COOR$_7$OR$_4$ wherein R$_4$ is an alkyl group containing from 1 to about 4 carbon atoms, —CH$_2$CF$_3$ or —CH$_2$CF$_2$CF$_2$H, R$_5$ and R$_6$ are alkyl groups containing from 1 to about 4 carbon atoms and R$_7$ is an alkylene group containing from 1 to about 4 carbon atoms. The mole ratio of hydrocarbon diene (a): $CH_2=CR_3X$ (b), when (b) is present, is from 1:7 to about 7:1 and the mole ratio of first monomer:second monomer is from about 4:3 to about 2:3. The copolymer thus obtained is hydrogenated in the presence of a transition metal catalyst and a trialkyl aluminum wherein the alkyl group contains from 1 to about 4 carbon atoms and further in the absence of boron trifluoride or boron trifluoride etherate. Additionally, a complexing agent for said transition metal catalyst is employed and said transition metal catalyst is deactivated after hydrogenation by the use of a second complexing agent, in the absence of air.

26 Claims, No Drawings

HIGH TEMPERATURE, OIL-RESISTANT ELASTOMERS FROM HYDROGENATED COPOLYMERS OF 1,3-DIENES CONTAINING FLUORINE

FIELD OF THE INVENTION

The present invention relates to high temperature, oil resistant elastomer compositions. The oil resistant elastomer composition are prepared from a hydrogenated copolymer of a fluorinated 1,3-diene and a hydrocarbon diene.

BACKGROUND

Commercially available fluoroelastomers are synthesized by the copolymerization of fluoro olefins, for example

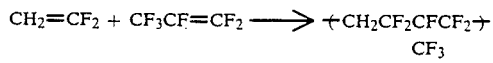

Due to the saturated backbone and presence of carbon fluorine bonds, the fluoro polymers have high thermooxidative stability when compared to their hydrocarbon counterparts. The major drawback of these fluoro elastomers is their poor low temperature properties which is reflected in relatively high glass transition temperatures (Tg). The Tg's of oil resistant non-fluorinated elastomers are lower. Nitrile and hydrogenated nitrile rubber exhibit Tg's of about minus 30° C. versus a Tg of minus 20° C. for the fluorinated copolymer described above.

Elastomers derived from the copolymerization of fluorinated olefins with hydrocarbon olefins are also heat resistant due to the saturated backbone in these polymers. However, heat and oil resistance is lower, the lower the fluorine content. Also glass transition temperature of these elastomers is not significantly improved when compared with the corresponding highly fluorinated counterparts.

When a hydrocarbon diene such as 1,3-butadiene bears a fluorinated substituent such as 2-trifluoromethyl, elastomeric homopolymers are obtained. Free radical polymerization can occur in a 1,2; 3,4; or 1,4 manner. Polymerization in the latter mode would lead to backbone unsaturation in the polymer, which is detrimental to the thermooxidative stability of the polymer, more so than the pendant unsaturation generated by polymerization in a 1,2- or 1,4- manner. Elastomeric polymers are also obtained when the hydrogen atoms of 1,3-butadiene are substituted with fluorine atoms (e.g., polyfluoroprene). However, these polymers also suffer from poor thermooxidative instability due to the presence of backbone unsaturation. Thermooxidative stability is increased in polymers derived from highly fluorinated 1,3-dienes, but these materials tend to be plastics.

Highly fluorinated 1,3-dienes can be copolymerized in emulsion with 1,3-diene hydrocarbons. Relatively low Tg materials can thus be obtained. For example, a copolymer of 1,1,2-trifluorobutadiene with butadiene in a 1 to 1 mole ratio has a Tg of minus 48° C.

U.S. Pat. No. 3,308,175 (Barr, Mar. 7, 1967) relates to novel fluorine-substituted dienes, to a method for the preparation thereof, to certain novel intermediates and the preparation thereof, and to certain novel intermediates for the production of homologous fluorine-substituted dienes.

U.S. Pat. No. 3,379,773 (Barr, Apr. 23, 1968) relates to polymeric compositions and to processes for the preparation of those compositions. Copolymers of 1,1,2-trifluorobutadiene-1,3 and the method of preparing the same are described within this reference along with comonomers hexafluorobutadiene-1,3; 3,4-dichloro-3,4,4-trifluorobutene-1; 2,2,2-trifluoroethyl vinyl ether; vinyl chloride; styrene; 1,1,2-trifluorobutene-1; and 1,1,4,4-tetrafluorobutadiene-1,3.

U.S. Pat. No. 3,398,128 (Bolstad et al, Aug. 20, 1968) relates to halogen-containing copolymers of 1,1,2-trifluorobutadiene-1,3 and another fluorinated 1,3-diene having from 4 to 5 carbon atoms per molecule containing two fluorine atoms on a terminal carbon atom and at least one hydrogen atom and the process for copolymerization of those monomers to produce such copolymers.

U.S. Pat. No. 3,562,341 (Tarrant et al, Feb. 9, 1971) relates to incompletely polyfluorinated 1,3-dienes capable of forming crosslinked polymers and having fluorine substituents in at least the 1,1,2-position, and to synthesis for their preparation. More particularly, this reference relates to a synthesis for 1,1,2-trifluorobutadiene-1,3 and to the compounds 1,1,2,4,4-pentafluorobutadiene-1,3, and 1,1,2,4,4-pentafluoro-3-methylbutadiene-1,3.

U.S. Pat. No. 3,607,850 (Smith, Sept. 21, 1971) relates to a method of polymerizing conjugated fluorinated dienes which are rubber-like, flexible at low temperatures, and resistant to mineral oils and other chemicals. More particularly, the reference relates to use of rhodium salts or complexes as catalysts for the polymerization or copolymerization of conjugated fluorinated dienes to produce high molecular weight elastomers.

SUMMARY OF THE INVENTION

Fluorinated copolymers which function as oil resistant elastomers are prepared by emulsion copolymerization of two monomer classes. The first monomer comprises a fluorodiene of the structure

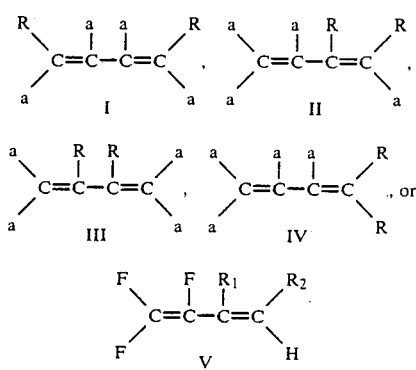

wherein substituent a is independently hydrogen or fluorine, R is hydrogen or a fluoro alkyl group containing from 1 to about 4 carbon atoms and containing at least three fluoro atoms, with the proviso that both R's are not hydrogen, $R_1$ and $R_2$ are independently fluorine, hydrogen or a fluoro alkyl group containing from 1 to about 4 carbon atoms and containing at least three fluorine atoms.

The second monomer is (a) a hydrocarbon diene comprising a conjugated diene, a branched conjugated diene or mixtures thereof containing from 4 to about 8 carbon atoms or a mixture of (a) with (b), a monomer of the general formula $CH_2=CR_3X$ wherein $R_3$ is hydrogen or an alkyl group containing from 1 to about 4 carbon atoms, and X is 2-pyridyl, 4-pyridyl, $-COOR_4$, $-CONR_5R_6$ or $-COOR_7OR_4$ wherein $R_4$ is an alkyl group containing from 1 to about 4 carbon atoms, $-CH_2CF_3$ or $-CH_2CF_2CF_2H$, $R_5$ and $R_6$ are alkyl groups containing from 1 to about 4 carbon atoms and $R_7$ is an alkylene group containing from 1 to about 4 carbon atoms. The mole ratio of diene (a): $CH_2=CR_3X$ (b), when (b) is present, is from 1:7 to about 7:1 and wherein the mole ratio of first monomer:second monomer is from about 4:3 to about 2:3.

The copolymer so formed is then hydrogenated using a transitional metal catalyst and a complexing agent and the transitional metal catalyst is deactivated after hydrogenation by using a second complexing agent, in the absence of air.

DETAILED DESCRIPTION OF THE INVENTION

In the present invention, fluorine containing 1,3-dienes are copolymerized with hydrocarbon 1,3-dienes. Glass transition temperature and oil resistance are dependent upon the fluorine content. Generally, the unsaturation of fluorinated 1,3-dienes is unaffected by the hydrogenation process. Thermooxidative stability is improved greatly by removal of carbon/carbon unsaturation that derived from the hydrocarbon diene in the polymer by hydrogenation. Thus, thermooxidatively stable oil-resistant polymers with good low temperature properties are obtained. The use of 1,3-butadiene as a comonomer yields strong elastomers due to stretch crystallizable polyethylene segments in the polymer that are formed by the hydrogenation process. The use of the relatively inexpensive hydrocarbon-based dienes help lower raw material costs.

Additionally, copolymers can be formed with acrylates, vinyl pyridines, hydrocarbon 1,3-dienes and fluorinated 1,3-dienes. The polar groups in the copolymer contribute towards polymer oil resistance while maintaining polymer thermooxidative stability.

A hydrogenated copolymer is prepared from at least two monomers. A copolymer is formed by emulsion polymerization and then hydrogenated to obtain a thermooxidatively stable composition. The copolymer is prepared from two monomer classes. The first monomer comprises a fluorodiene of the structure

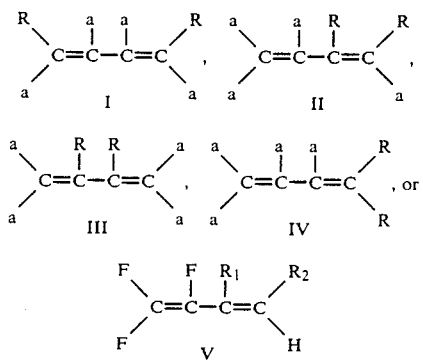

wherein substituent a is independently hydrogen or fluorine, R is hydrogen or a fluoro alkyl group containing from 1 to about 4 carbon atoms and containing at least three fluoro atoms, with the proviso that both R's are not hydrogen, $R_1$ and $R_2$ are independently fluorine, hydrogen or a fluoro alkyl group containing from 1 to about 4 carbon atoms and containing at least three fluorine atoms.

The second monomer is (a) a hydrocarbon diene comprising a conjugated diene, a branched conjugated diene or mixtures thereof containing from 4 to about 8 carbon atoms or a mixture of (a) with (b), a monomer of the general formula $CH_2=CR_3X$ wherein $R_3$ is hydrogen or an alkyl group containing from 1 to about 4 carbon atoms, and X is 2-pyridyl, 4-pyridyl, $-COOR_4$, $-CONR_5R_6$ or $-COOR_7OR_4$ wherein $R_4$ is an alkyl group containing from 1 to about 4 carbon atoms, $-CH_2CF_3$ or $-CH_2CF_2CF_2H$, $R_5$ and $R_6$ are alkyl groups containing from 1 to about 4 carbon atoms and $R_7$ is an alkylene group containing from 1 to about 4 carbon atoms. The mole ratio of diene (a): $CH_2=CR_3X$ (b), when (b) is present, is from 1:7 to about 7:1 and wherein the mole ratio of first monomer:second monomer is from about 4:3 to about 2:3.

The first monomer is a fluorodiene. Some representative examples of fluorodienes of the above structures I through V are:

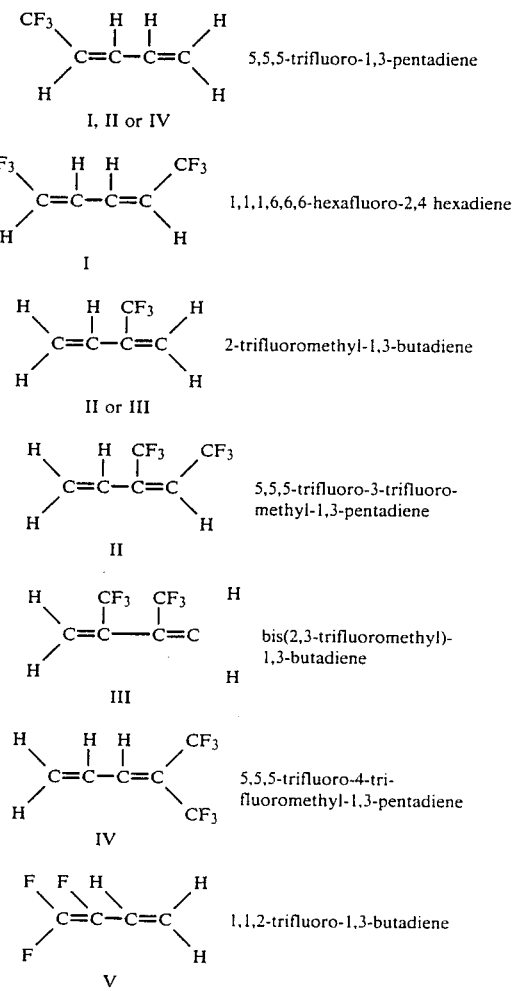

The term "fluoroalkyl" as used herein signifies that hydrogens of an alkyl group are replaced with fluorine. Structural examples of fluoro alkyl groups are: —CF$_3$, —CH$_2$CF$_3$, —CHFCHF$_2$, —CF$_2$CH$_2$F, —CHFCF$_3$, —CF$_2$CHF$_2$, —CF$_2$CF$_3$, —CH$_2$CH$_2$CF$_3$, —CH$_2$CHFCHF$_2$, —CH$_2$CF$_2$CF$_3$, —CH$_2$CH$_2$CH$_2$CF$_3$, —CH$_2$CH$_2$CHFCHF$_2$, —CH$_2$CH$_2$CHFCF$_3$, —CH$_2$CH$_2$CF$_2$CF$_3$, —CH$_2$CH$_2$CHFCHF$_2$, —CH$_2$CH$_2$CHFCF$_3$. This list is intended to be merely illustrative and not exhaustive, and the omission of a certain structure is not meant to require its exclusion. Preferably the fluoro alkyl group contains from 1 to 2 carbon atoms and has at least three fluoro atoms. Preferable fluoro alkyl groups are —CF$_3$, —CH$_2$CF$_3$, —CF$_2$CF$_3$ or —CF$_2$CHF$_2$. The most preferable fluoro alkyl group is —CF$_3$.

One of the structural formulae I through V is utilized as the first monomer and its disclosure above is hereby incorporated in toto. The second monomer is (a) a straight chain conjugated diene, a branched conjugated diene, or mixtures thereof containing from 4 to 8 carbon atoms. Examples of straight chain dienes are 1,3-butadiene, 1,3-pentadiene, 1,3-hexadiene, 1,4-hexadiene, 1,3-heptadiene, 2,4-heptadiene, 1,3-octadiene, 2,4-octadiene, and 3,5-octadiene. Some representative examples of branched chain dienes are isoprene, 2,3-dimethyl-1,3-butadiene, 2-methyl-1,3-hexadiene, 3-methyl-1,3-hexadiene, 2-methyl-2,4-hexadiene, 3-methyl-2,4-hexadiene, 2,3-dimethyl-1,3-pentadiene, 2,4-dimethyl-1,3-pentadiene, 2-ethyl-1,3-pentadiene, and 3-ethyl-1,3-pentadiene. The preferred dienes for the practice of the invention are butadiene and isoprene.

The second monomer may also be (b), a monomer of the general formula CH$_2$=CR$_3$X wherein R$_3$ is hydrogen or an alkyl group containing from 1 to about 4 carbon atoms, and X is 2-pyridyl, 4-pyridyl, —COOR$_4$, —CONR$_5$R$_6$ or —COOR$_7$OR$_4$ wherein R$_4$ is an alkyl group containing from 1 to about 4 carbon atoms, —CH$_2$CF$_3$ or —CH$_2$CF$_2$CF$_2$H, R$_5$ and R$_6$ are alkyl groups containing from 1 to about 4 carbon atoms and R$_7$ is an alkylene group containing from 1 to about 4 carbon atoms; or mixtures of diene (a) and CH$_2$=CR$_3$X (b), wherein the mole ratio of diene (a): CH$_2$=CR$_3$X (b), when (b) is present, is from 1:7 to about 7:1 and wherein the mole ratio of first monomer:second monomer is from about 4:3 to about 2:3.

Preferably R$_3$ is hydrogen or an alkyl group containing from 1 to 2 carbon atoms and most preferably R$_3$ is hydrogen or methyl. When X is —COOR$_4$, R$_4$ preferably is an alkyl group containing from 1 to 2 carbon atoms, most preferably R$_4$ is methyl. When X is —CONR$_5$R$_6$, preferably R$_5$ and R$_6$ are alkyl groups independently containing from 1 to 2 carbon atoms and most preferably R$_5$ and R$_6$ are independently hydrogen or methyl. When X is —COOR$_7$OR$_4$, preferably R$_7$ is an alkylene group containing from 1 to about 2 carbon atoms and R$_4$ is an alkyl group containing from 1 to about 2 carbon atoms. When R$_3$ is hydrogen or methyl and X is —COOR$_4$, some examples of CH$_2$=CR$_3$X are acrylates, methacrylates, fluorinated acrylates, or fluorinated methacrylates. When R$_3$ is hydrogen or methyl and X is —CONR$_5$R$_6$, CH$_2$=CR$_3$X may be tertiary acrylamides or tertiary methacrylamides. When R$_3$ is hydrogen or methyl and X is —COOR$_7$OR$_4$, some examples of CH$_2$=CR$_3$X are alkoxyalkyl acrylates or methacrylates.

When the second monomer comprises both (a) and (b), the mole ratio of diene (a): CH$_2$=CR$_3$X(b) is from about 1:7 to about 7:1, preferably 1:5 to about 5:1 and most preferably 3:1 to about 4:1.

The hydrogenated copolymers of this invention have utility as high temperature oil-resistant elastomers. The hydrogenated copolymers of this invention may be solids or liquids, depending on molecular weight. These hydrogenated copolymers serve as thermooxidatively stable oil-resistant elastomers or as impact modifiers for plastics. Products made from these elastomers find use for seals, gaskets, and hoses. The liquid polymers can be used as processing aids and/or modifiers in rubber and plastic compounding.

The first step in the preparation of an oil-resistant elastomer is in forming a copolymer. The copolymer is formed by emulsion polymerization. For the formation of the copolymer, the mole ratio of the first monomer:second monomer is from about 4:3, preferably 2:3, and most preferably 1:1.

The copolymer is made in a conventional manner. That is, the above-noted monomer(s) is (are) added to suitable amounts of water in a polymerization vessel along with one or more conventional ingredients and polymerized. The amount of polymerized solids or particles is generally from about 15 percent to about 50 percent with from about 25 to about 35 percent by weight being desired. The temperature of polymerization is generally from about 5° C. to about 80° C. with from about 5° C. to about 20° C. being preferred. Typically in excess of 60 percent conversion is obtained with from about 80 percent to about 85 percent conversation being preferred. The copolymerization is generally initiated by free radical catalysts which are utilized in conventional amounts. Examples of such catalysts include organic peroxides and hydroperoxides such as benzoyl peroxide, dicumyl peroxide, cumene hydroperoxide, paramenthane hydroperoxide, and the like, used alone or with redox systems; diazo compounds such as azobisisobutyronitrile, and the like; persulfate salts such as sodium, potassium, and ammonium persulfate, used alone or with redox systems; and the use of ultraviolet light with photosensitive agents such as benzophenone, triphenylphosphine, organic diazos, and the like.

Inasmuch as the copolymers are prepared via an emulsion latex polymerization route, anionic emulsifying aids are utilized. Thus, various conventional anionic surfactants known to the art as well as to the literature are utilized. Generally, any suitable anionic surfactant can be utilized such as those set forth in McCutcheons, "Detergents and Emulsifiers," 1978, North American Edition, Published by McCutcheon's Division, MC Publishing Corp., Glen Rock, N.J., U.S.A., as well as the various subsequent editions thereof, all of which are hereby fully incorporated by reference. Desirably, various conventional soaps or detergents are utilized such as a sodium alkyl sulfate, wherein the alkyl has from 8 to 22 carbon atoms such as sodium lauryl sulfate, sodium stearyl sulfate, and the like, as well as various sodium alkyl benzene sulfonates, wherein the alkyl has from 8 to 22 carbon atoms such as sodium dodecyl benzene sulfonate, and the like. Other anionic surfactants include sulfosuccinates and disulfonated alkyl benzene derivatives having a total of from 8 to 22 carbon atoms. Various phenyl type phosphates can also be utilized. Yet other anionic surfactants include various fatty acid salts having from 12 to 22 carbon atoms as well as various rosin acid salts wherein the salt portion is generally lithium, sodium, potassium, ammonium, magnesium, and the like. The selection of the anionic surfactant generally depends on the pH of the polymerization. Hence, fatty acid salts and rosin acids salts are not utilized at low pH values.

The amount of the surfactant can vary depending upon the size of random polymer or copolymer particles desired, but typically is from about 1 percent to about 6 percent and desirably from about 2 percent to about 3 percent by weight for every 100 parts by weight of the random polymer or copolymer forming monomer(s).

Other anionic emulsifying aids are various anionic electrolytes which control particle size by controlling the solubility of the soap. Examples of various conventional electrolytes generally include sodium, potassium, or ammonium naphthalene sulfonates. Other suitable electrolytes include sodium sulfate, sodium carbonate, sodium chloride, potassium carbonate, and the like. The amount of electrolyte is generally from about 0.1 to about 1.0 parts by weight with from about 0.2 to about 0.5 parts by weight for every 100 parts by weight of the random copolymer forming monomers.

Molecular weight modifiers are also utilized to maintain the molecular weight within desirably limits as otherwise the viscosity of the polymer would be exceedingly high for subsequent handling, processing, and the like. Generally, known conventional molecular weight modifiers can be utilized such as various mercaptans which have from about 8 to about 22 carbon atoms, generally in the form of an alkyl group. Various sulfide compounds can also be utilized such as diisopropylxanthogendisulfide and di-sec-butylxanthogendisulfide. The amount of the molecular modifiers is generally an effective amount such that the Mooney viscosity, that is $ML_4$ @100° C. is from about 10 to about 120 and desirably from about 20 to about 80.

Yet another conventional emulsion latex additive is various short stop agents which are added generally to stop the polymerization and to tie up and react with residual catalysts. The amount of the short stop agents is from about 0.05 to about 1.0 parts by weight per 100 parts by weight of said random copolymer forming monomers. Examples of specific short stop agents include hydroxyl ammonium sulfate, hydroquinone and derivatives thereof, e.g., ditertiaryamylhydroquinone, various carbamate salts such as sodium diethyldithiocarbamate, various hydroxyl amine salts, and the like. Various antioxidants can be added and such are known to the art as well as to the literature including various phenolic type antioxidants such as di-tert-butyl-para-cresol, various diphenylamine antioxidants such as octylated diphenylamine, various phosphite antioxidants such as trisnonyl phenyl phosphite, and the like. Once the short stop has been added to the latex solution, excess monomer is stripped from the resultant latex, as for example by steam.

According to the concepts of the present invention, a cationic coagulant polymer is utilized to coagulate the anionic emulsifying aids such as the various anionic surfactants and the various anionic electrolytes utilized. Polymeric cationic type coagulants are utilized according to the present invention inasmuch as they have a positive site which generally reacts with the negative or anionic site of the surfactant, electrolyte, etc., and thereby neutralize the same and render it innocuous. That is, according to the concepts of the present invention, the anionic emulsifying aids are not physically removed but rather are chemically reacted with a cationic polymeric coagulant to form an adduct which is generally dispersed throughout the random copolymer particle.

An important aspect of the present invention is that large stoichiometrically equivalent amounts of cationic polymeric coagulants are utilized. That is, large weight equivalents are required in order to yield a random polymer or copolymer having improved properties. Generally, from about 0.75 to about 1.5 weight equivalents, desirably from about 0.85 to about 1.25, and preferably from about 0.95 to about 1.05 weight equivalents of the cationic polymeric coagulant is utilized for every weight equivalent of said anionic emulsifying aids. Equivalent weight amounts less than those set forth herein do not result in effective neutralization, typing up, or negate the effect which the various anionic emulsifying aids have upon the properties of the dried rubber particles.

The cationic polymeric coagulants utilized in the present invention generally contain a tetravalent nitrogen and are sometimes referred to as polyquats. Cationicity of the quaternary nitrogen is generally independent of pH, although other parts of the polymer molecule may exhibit sensitivity to pH such as hydrolysis of ester linkages. Typically, cationic polymers are prepared either by quaternization of poly(alkylene polyamines), poly(hydroxyalkylene polyamines), or poly(carbonylalkylene polyamine) with alkyl halides or sulfates, or by step-growth polymerization from dialkylamines, tetraalkyl amines, or derivatives thereof, with suitable bifunctional alkylating agents, and with or without small amounts of polyfunctional primary amines (such as ammonia, ethylene diamines, and others) for molecular weight enhancement. Polyamines produced from ammonia and ethylene dichloride, quaternized with methyl chloride, and polyquaternaries produced directly from dimethylamine and 1-chloro-2,3-epoxypropane are generally of commercial significance. Epichlorohydrin reacts with ammonia and primary, secondary, or polyfunctional amines to form polyamines or polyquats. The polyamines can be subsequently quaternized to yield a cationic polymeric coagulant of the present invention. As known to those skilled in the art and to the literature, literally hundreds of cationic polymeric coagulants exist and generally the same can be utilized in the present invention. Examples of specific polymeric cationic coagulants include poly(2-hydroxypropyl-1-N-methylammonium chloride), poly(2-hydroxypropyl-1, N-N-dimethylammonium chloride), poly(diallyldimethylammonium chloride), poly(N,N-dimethylaminoethyl methacrylate) quaternized, and a quaternized polymer of epichlorohydrin and a dialkylamine wherein the alkyl group has from 1 to 5 carbon atoms with methyl being preferred. The method of preparing cationic polymeric coagulants, general types of such compounds as well as specific individual compounds are set forth in the following documents which are hereby fully incorporated by reference with regard to all aspects thereof:

*Encyclopedia of Polymer Science and Technology*, John Wiley & Sons, New York, 1987, Volume 11, 2nd Edition, pages 489–503.

*Encyclopedia of Polymer Science and Technology*, John Wiley & Sons, New York, 1987, Volume 7, 2nd Edition, pages 211–229.

*Kirk Othermer's Encyclopedia of Chemical Technology*, 3rd Edition, Volume 10, John Wiley & Sons, New York, 1980, pages 489–523.

A text entitled *Commercial Organic Flocculants*, Josef Vostrcil and Frantisek Juracka, Noyes Data Corporation, Park Ridge, N.J., 1976, in its entirety.

The cationic polymeric coagulants utilized in the present invention generally have a molecular weight of from about 1,000 to about 10,000,000.

According to the present invention, the cationic polymeric coagulant treated copolymer latex generally results in a slurry of rubber crumbs in a clear aqueous liquid. The crumbs contain the various anionic emulsifying aids physically incorporated therein. Such crumbs can be separated in any conventional manner as by filtering. Inasmuch as the anionic emulsifying aids have been rendered innocuous, multiple washing steps or other expensive, tedious process steps such as solvent extraction are not utilized.

The copolymer of the present invention once dried as by conventional means, has improved properties such as good water resistance, good adhesion properties, non-interference with cure systems when cured, reduce fouling of molds during the manufacture of parts, improved electrical insulating properties, and the like. Such copolymers can accordingly be utilized as adhesives, that is polymeric adhesives, binders, films, e.g., electrical insulating films, coatings such as for electrical circuit boards along with other conventional coating additives and fillers known to the art and to the literature, and the like. Suitable adhesive uses include metal-to-metal adhesion, metal-to-fabric adhesion, metal-to-plastic adhesion, and the like. Additionally, the polymers of this invention have utility in the automotive area such as in hoses, gaskets, seals, and timing belts.

The copolymer can be prepared with a mercaptan chain transfer agent composition comprising (a) at least one mercaptan chain transfer agent and optionally (b) at least one non-polymerizable material which is miscible with the mercaptan chain transfer agent. Suitable mercaptans include water soluble mercaptans such as 2-mercaptoethanol, 3-mercaptopropanol, thiopropyleneglycol, thioglycerine, thioglycolic acid, thiohydracrylic acid, thiolactic acid, and thiomalic acid, and the like. Suitable non-water soluble mercaptans include isooctyl thioglycolate, n-butyl 3-mercaptopropionate, n-butyl thioglycolate, glycol dimercaptoacetate, trimethylolpropane trithioglycolate, alkyl mercaptans, and the like. The preferred mercaptans are 2-mercaptoethanol and t-dodecylmercaptan. However, any chain transfer agent having a mercapto (—SH) group would be acceptable.

The chain transfer composition may comprise, in addition to the mercaptan, at least one non-polymerizable material which is miscible with the mercaptan and is substantially insoluble in water. The term non-polymerizable as used herein means that the material does not form a part of the copolymer chain in the sense that a traditional comonomer would form. The non-polymerizable material may, in some cases, graft polymerize onto the random copolymer chain but this is not normally considered a copolymer. The term substantially insoluble in water as used in this specification means that the material has less than 5 percent solubility in water. The non-polymerizable material may be a monomer, oligomer or a polymer. Suitable non-polymerizable materials include dioctyl phthalate, low molecular weight poly(caprolactone), polysilicones, esters of glycerols, polyesters, water insoluble esters of fatty acids with OH terminated polyoxyethylene and polyoxypropylene, esters of polyols, esters of monoacids and polyacids, esters of organic polyphosphates, phenyl ethers, ethoxylated alkylphenols, sorbitan monostearate and sorbitan monooleate and other sorbitol esters of fatty acids. The choice of material is not critical as long as the material is non-polymerizable with the monomers and is substantially insoluble in water.

The chain transfer composition must contain at least enough non-polymerizable material to encapsulate the mercaptan chain transfer agent. This amount varies according to the type and amount of chain transfer agent used. Usually, the chain transfer composition must contain at least an equal amount in weight of non-polymerizable material as chain transfer agent in order to encapsulate or host the chain transfer agent. Preferably, the composition contains at least twice as much weight of non-polymerizable material as chain transfer agent. Other non-essential ingredients may be used in the chain transfer compositions of this invention but are not preferred.

The chain transfer compositions are formed by mixing the two essential ingredients together. The method used to mix the ingredients is not critical and may be any of the known methods used by those skilled in the art. The ingredients may even be charged to the polymerization reactor and mixed before adding the other polymerization ingredients but is preferably mixed outside the reactor.

Because of the detrimental effects that mercaptans, such as 2-mercaptoethanol have on colloidal stability, it is necessary to mix the 2-mercaptoethanol with the non-polymerizable material before adding it to the reaction mix. The non-polymerizable material serves as a host material for the chain transfer agent. This procedure surprisingly eliminates the adverse effects of 2-mercaptoethanol on colloidal stability. It is believed that the non-polymerizable material averts the adverse effect of 2-mercaptoethanol on colloidal stability via encapsulation, complexation or interaction and, thus, allows relatively high levels of 2-mercaptoethanol to be introduced to the reaction medium prior to the start of polymerization. The term "encapsulation" as used herein is not intended as the traditional meaning of encapsulation which is to coat or contain and the result is a heterogeneous system. The chain transfer composition of this invention is homogeneous.

The level of chain transfer composition used to make the random copolymer will be described in terms of the level of mercaptan in the composition. The level of mercaptan used is greater than 0.03 part by weight per 100 parts by weight of diene monomer. The preferred levels of mercaptan range from about 0.03 to about 5.00 parts by weight per 100 parts of monomer, and, preferably, from 0.10 to 1.50 parts.

When high amounts of mercaptan, such as 2-mercaptoethanol, are used, it is desirable not to charge the entire amount of chain transfer agent at the beginning of polymerization since 2-mercaptoethanol has a diminishing effect on molecular weight above about the 1.5 parts level. Therefore, if, for example, 3.0 parts were used, it would be advisable to add only up to 1.5 parts at the beginning of polymerization and to gradually add the remainder during polymerization. Amounts added at the beginning which are greater than 1.5 parts do not result in colloidal instability. However, for the most efficient use of chain transfer agent, it is preferred to add not more than 1.5 parts before the beginning of polymerization. This preferred initial level could, of course, be different for different mercaptans. The above described preferred procedure is for 2-mercaptoethanol.

If less than 0.25 part by weight of chain transfer agent is used, then all of the chain transfer agent will be added in the form of the chain transfer composition before the beginning of polymerization. If more than 0.25 part is used, then at least 0.25 part will be added in the form of the chain transfer composition before the beginning of polymerization and the remainder may be added later. To gain the most efficiency of the chain transfer agent, no more than 1.5 parts by weight should be added before the start of polymerization. For best results, at least 50 percent of the chain transfer agent, preferably 100 percent, is added to the polymerization medium prior to the start of polymerization. Any amount not added at the start and not encapsulated should be added after the polymerization has reached about 10 percent conversion to maintain colloidal stability. Except for the use of the chain transfer composition, the polymerization is much the same as in any conventional polymerization of a diene monomer in an aqueous medium.

Another class of chain-transfer agents that are used in the process of this invention are mercapto organic compounds having at least one ether linkage that have the structural formula

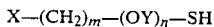
X—(CH$_2$)$_m$—(OY)$_n$—SH wherein X represents hydrogen or —SH, Y represents an alkylene group having 1 to 6 carbon atoms, and m and n each represents a number in the range of 1 to 10.

A preferred group of ether linkage chain-transfer agents includes mercapto organic compounds that have the structural formula

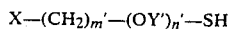
X—(CH$_2$)$_{m'}$—(OY')$_{n'}$—SH wherein X represents hydrogen or —SH, Y' represents an alkylene group having 2 to 4 carbon atoms, and m' and n' each represents a number in the range of 2 to 4.

Illustrative of the ether linkage chain transfer agents that can be used in the practice of this invention are the following compounds:
mercaptomethyl ethyl ether,
2-mercaptoethyl ethyl ether,
2-mercaptoethyl propyl ether,
2-mercaptoethyl butyl ether,
3-mercaptopropyl methyl ether,
3-mercaptopropyl ethyl ether,
3-mercaptopropyl butyl ether,
2-mercaptopropyl isopropyl ether,
4-mercaptobutyl ethyl ether,
bis-(2-mercaptoethyl) ether,
bis-(3-mercaptopropyl) ether,
bis-(4-mercaptobutyl) ether,
(2-mercaptoethyl) (3-mercaptopropyl) ether,
(2-mercaptoethyl) (4-mercaptobutyl) ether,
ethoxypolypropylene glycol mercaptan,
methoxypolyethylene glycol mercaptan,
and the like and mixtures thereof.

Among the preferred ether linkage chain-transfer agents are 2-mercaptoethyl ethyl ether and bis-(2-mercaptoethyl) ether.

The amount of the ether linkage chain-transfer agent that is used in the polymerization reaction is that which will provide a polymer having the desired molecular weight or degree of polymerization. In most cases from 0.01 percent to 2 percent by weight, based on the weight of the monomer component, is used. When a low molecular weight product that has a relative viscosity in the range of 1.20 to 1.60 is desired, the amount of chain transfer agent used is preferably in the range of 0.25 percent to 1.75 percent by weight, based on the weight of the monomer. Amounts in the range of 0.05 percent to 0.15 by weight, based on the weight of the monomer, are preferably used to produce polymers having high molecular weights.

The invention will be better understood by reference to the following examples.

The below example outlines the emulsion polymerization of 1,1,2-trifluorobutadiene and butadiene.

EXAMPLE 1

To a 1 liter carbonated beverage bottle was added 121 g water. The water was deoxygenated by bubbling in nitrogen before mixing in any additional components. Added were 2.0 g 45 percent sodium lauryl sulfate emulsifier, 0.063 g sodium naphthalene sulfonate secondary emulsifier and 0.075 g sodium carbonate electrolyte. A magnetic stirrer bar was added to the bottle which was flushed with nitrogen and filled with a septum. About 21.2 g 1,1,2-trifluoro-butadiene was generated per a procedure of J. Org. Chem., 53, 2304 (1988) and condensed directly into the cooled (dry ice/acetone) beverage bottle. About 10 g liquid butadiene was then injected into the bottle via syringe, and then 0.26 g t-dodecylmercaptan chain transfer agent was also injected and the contents were gradually allowed to warm up to 5° C. in an ice bath.

The following were freshly dissolved in 10 ml of deoxygenated water: About 0.0124 g sodium hydrosulfite oxygen scavenger, 0.0037 g trisodium ethylene diamine tetraacetate trihydrate complexing agent, 0.0056 g sodium ferric ethylenediamine tetraacetate and 0.0391 g sodium formaldehyde sulfoxylate. One-half of this solution was injected into the beverage bottle followed by the introduction of 0.062 g paramenthane hydroperoxide initiator. After stirring for 4 hours at 5° C., the contents were allowed to gradually warm up to room temperature overnight.

After the bottle was vented 0.1 g hydroxyl ammonium sulfate short stop dissolved in 1 ml water was added to the latex and stirring was continued for 15 minutes before adding 1.2 g 40 percent Aquamix 115 antioxidant. Stirring was continued for 20 more minutes and the latex was coagulated in 70° C. water containing 1.5 weight percent of aluminum sulfate. The rubbery crumbs (90 percent yield) were washed with water and dried in air (70° C.), followed by vacuum drying at 60° C. and 1 mm Hg for 4 hours.

The copolymer exhibited a single Tg at minus 47° C. The proton magnetic resonance spectrum of the copolymer in tetrahydrofuran d$_8$ was different from that of polybutadiene indicating a true copolymer. Aliphatic protons were observed as a complex multiplet at 0.8–3.6 ppm from tetramethylsilane and vinyl protons at 4.8–6.0 ppm. The ratio of the aliphatic to vinyl protons was 2.0. The carbon-carbon double bond of the trans 1,4-copolymerized fluorinated butadiene (CF$_2$=CF=CH—CH$_2$) was observed at 1715 cm$^{-1}$ in the infrared spectrum.

The cis and trans microstructures from the hydrocarbon diene generally are hydrogenated to linear polyethylene segments which are responsible for the improved mechanical properties of the elastomer due to stretch crystallinity (A. H. Weinstein, *Rubber Chemical Technology* 57, 203 (1984).

The copolymer once obtained is then subjected to hydrogenation in the presence of a transition metal catalyst, trialkylaluminum, and a complexing agent in the absence of $BF_3$ or $BF_3$ etherate.

Either a homogeneous or a heterogeneous catalyst may be used for the hydrogenation although a homogeneous catalyst is preferred. Since a homogeneous catalyst dissolves in solution, good contact is obtained with the high molecular weight random polymer or copolymer. The homogeneous catalysts are transition metal catalysts of either iron, cobalt, or nickel. These metals are present as halides, acetates, or acetylacetonates. Other homogeneous catalysts that can be employed are palladium, platinum or rhodium present as tetrakistriphenylphosphine palladium (0), tetrakistriphenylphosphine platinum (0) or tris-triphenylphosphine rhodium chloride.

The transition metal catalyst is employed with trialkyl aluminum, wherein the alkyl group contains from 1 to about 4 carbon atoms, which functions as a reducing agent. Other reducing agents that can be employed are dialkyl aluminum hydride, the dialkyl aluminum alkoxides of 1 to 4 carbon atoms, sodium borohydride, and lithium aluminum hydride. Additionally, other reductants are alkyl lithium, dialkyl magnesium, and alkyl magnesium halide wherein the alkyl groups are from 1 to 4 carbon atoms, and the halide is chloride or bromide.

The mole ratio of transition metal catalyst: reducing agent is usually from 1:10, preferably 1:6, and most preferably from 1:4.

The transition metal catalyst complexes with a complexing agent. Without a complexing agent, addition of the catalyst to the polymer solution causes gelation. This is due to the metal ion of the transition metal catalyst complexing with the polar groups on the polymeric chains. A gelled polymer is difficult to hydrogenate to a high degree. Also, a partially cross-linked polymer results. These factors cause the elastomer to be poorer in heat aging and physical properties when compared to the polymers of this invention.

In the present invention the complexing agents complex with the catalyst in order to prevent the catalyst from bonding to the polar functionalities. Thus the amount of complexing agent employed is related to the relatively low catalyst level. Generally, the mole ratio of catalyst:complexing agent is from 1:6, preferably 1:4; and most preferably 1:2.

The complexing agents for the catalysts are hexamethylphosphoric triamide, tetramethylethylenediamine, phosphines of the general formula $(R_7)_3P$, phosphites of the general formula $(R_7)_3P$ wherein $R_7$ is an alkyl group containing from 1 to about 6 carbon atoms, a phenyl group or a substituted aromatic group wherein the substituent is an alkyl group containing from 1 to 2 carbon atoms such as o-tolyl.

Solvents for the hydrogenation are well known in the art. An exemplary list of solvents are xylenes, toluenes, anisole, dioxane, tetrahydrofuran, hydrocarbons such as hexanes, heptanes, and octanes and chlorinated hydrocarbons such as chlorobenzene and tetrachloroethane, trisubstituted amines such as triethylamine and tetramethylethylene diamine.

The temperature of hydrogenation is generally from about 25° C. to about 150° C. with from about 25° C. to about 50° C. being preferred.

Removal of the transition metal catalyst is difficult and expensive. This is due to the high molecular weight of the polymer and also that the catalyst is intimately associated with the polymer. A catalyst, when left in contact with the hydrogenated polymer, shows a degradative action. This action is discussed in a paper by Zenairo Osawa titled "Rule of Metals and Metal Deactivators in Polymer Degradation." An approach of this invention was to remove the catalyst from the polymer and also to render the residual catalyst innocuous, that is, to deactivate the catalyst by the addition of a second complexing agent after hydrogenation in the absence of air. If the catalyst is not rendered innocuous, the polymer shows poor heat aging and high oil swell. Some examples of the second complexing agents are weak organic acids containing from 1 to about 4 carbon atoms such as formic acid, acetic acid, and propionic acid; diacids containing from 2 to about 6 carbon atoms such as oxalic acid, malonic acid, succinic acid, glutaric acid, and adipic acid; amino acids of 1 to about 4 carbon atoms such as glycine, alanine, alipha-glutaric acid, beta-glutaric acid, and gamma-glutaric acid; citric acid; pyridine or substituted pyridine wherein the substituent contains 1 to 2 carbon atoms; pyridine carboxylic acids such as nicotinic acid and the corresponding sodium or potassium salts; alkyl or aromatic nitriles containing from 1 to 6 carbon atoms; substituted ureas or thioureas such as N,N-dialkyldithiocarbamate metal salts of 1 to 4 carbon atoms wherein the metal is lithium, sodium, or potassium, hexamethylphosphoric triamide; tetramethylethylenediamine; phosphines $P(R_8)_3$ and phosphites $P(OR_8)_3$ wherein $R_8$ is aliphatic with 1 to 4 carbon atoms or aromatic such as $C_6H_5$, $C_6H_4CH_3$, naphthyl; olefins such as trans-1,2-dichloroethylene; inorganic salts such as iodides, cyanides, isocyanates, thiocyanates, thiocyanides, sulfides, hydrosulfides wherein the metals are sodium or potassium; and hydrogen sulfide as well as any mixtures thereof. A preferred second complexing agent is a solution of acetic acid and pyridine in a weight ratio of from about 7:1 to about 4:1 and most preferably of from about 6:1 to about 5:1.

Previously employed methods for catalyst removal moval have dealt with coagulation of the polymer solution in dilute aqueous inorganic acid and/or addition of polar organic solvents such as alcohols, ketones, or hot water/steam. When this approach was tried in the present invention, the product obtained still contained appreciable quantities of catalyst resulting in poor heat aging and high oil swell. The use of dilute aqueous inorganic acids for the present invention resulted in a product with embrittlement.

EXAMPLE 2

Under nitrogen, 15 grams of the product of Example 1 was dissolved in several portions in 300 ml dry tetrahydrofuran in a 500 ml three-necked round bottom flask equipped with a magnetic stirring bar. The copolymer was completely dissolved in about four hours.

Preparation of the Hydrogenation Catalyst Solution

Under nitrogen, a solution of 1.6 grams (12 weight percent) of cobalt (II) neodecanote in mineral spirits and 3.5 grams hexamethylphosphoric triamide was prepared and cooled by means of an ice bath to about 3° C. To this purple solution was added, drop-wise, 6.4 ml (25 weight percent, 1.9 molar solution) of triethylaluminum in toluene. Evolution of gases occurred and the purple solution turned brown upon the addition of the triethylaluminum. After the addition of the triethylaluminum solution, a hydrogenation catalyst solution was stirred under nitrogen for 1.5 hours at room temperature.

The hydrogenation catalyst was then added slowly to the stirred copolymer solution. The copolymer solution was then transferred under nitrogen into an 800 ml pressure vessel, followed by the introduction of hydrogen (500 psi). Periodically, the reactor was repressurized to 500 psi in order to compensate for hydrogen uptake by the copolymer. When hydrogen uptake at room temperature ceased, the copolymer solution was heated to 50° C. and the hydrogen pressure increased to 1000 psi. Again, repressurization was continued to compensate for hydrogen uptake by the copolymer. After a total time of about six hours, hydrogen uptake stopped. The copolymer solution was then cooled to room temperture. Excess hydrogen was vented and replaced with a nitrogen blanket. A solution of glacial acetic acid (30 ml) and pyridine (1 ml), deoxygenated by bubbling in nitrogen, was then added under nitrogen to the copolymer solution. After shaking for one hour at room temperature, the copolymer solution was coagulated in hot (70° C.) water, filtered and dried in air (100° C., four hours), followed by drying in vacuum (80° C., 1 mm Hg, two hours).

The action of the acetic acid/pyridine solution on the cobalt ions under anaerobic conditions was important in rendering the residual cobalt catalyst (intimately mixed in with the polymer) innocuous to polymer degradation. Without this treatment, the hydrogenated polymer exhibits poor heat aging and high oil swell in hydrocarbon oils. When acetic acid/pyridine solution is added to the solution of the hydrogenated polymer in the presence of air, prior to polymer coagulation, heat aging is not improved.

The proton magnetic resonance spectrum of the hydrogenated copolymer in tetrahydrofuran-$d_8$ exhibited absorptions at 0.7–3.0 ppm (aliphatic protons) and 4.2–4.75, 5.1–5.75 ppm (vinyl protons) from tetramethylsilane. The ratio of aliphatic to vinyl protons was 8.0. The carbon-carbon double bond of the trans 1,4-copolymerized fluorinated butadiene ($CF_2$—$CF$=$CH$—$CH_2$) was unaffected by the hydrogenation process. The infrared absorption due to this carbon-carbon unsaturation remained unchanged at 1715 cm$^{-1}$ when compared with the starting material. Elemented (carbon, hydrogen, fluorine) analysis of the product indicated 94 percent hydrogenation of the unsaturation derived from butadiene.

While in accordance with the Patent Statutes, the best mode and preferred embodiment has been set forth, the scope of the invention is not limited thereto, but rather by the scope of the attached claims.

What is claimed is:

1. A high temperature oil elastomeric composition, comprising:
    a hydrogenated copolymer, said copolymer prepared by the copolymerization of a polar first monomer of

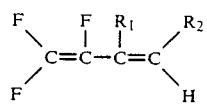

wherein $R_1$ and $R_2$ are independently fluorine, hydrogen, or a fluoro alkyl group containing from 1 to about 4 carbon atoms and containing at least three fluorine atoms;
    and a second monomer wherein said second monomer is (a) a conjugated diene, a branched conjugated diene, or mixtures thereof containing from 4 to 8 carbon atoms; or (b) a monomer of the general formula $CH_2$=$CR_3X$ wherein $R_3$ is hydrogen or an alkyl group containing from 1 to 4 carbon atoms, and X is 2-pyridyl, 4-pyridyl, —$COOR_4$, —$CONR_5R_6$ or —$COOR_7OR_4$ wherein $R_4$ is an alkyl group containing from 1 to about 4 carbon atoms, —$CH_2CF_3$ or —$CH_2CF_2CF_2H$, $R_5$ and $R_6$ are alkyl groups containing from 1 to about 4 carbon atoms and $R_7$ is an alkylene group containing from 1 to about 4 carbon atoms; or mixtures of diene (a) and $CH_2$=$CR_3X$ (b), wherein the mole ratio of diene (a): $CH_2$=$CR_3X$ (b), when (b) is present, is from 1:7 to about 7:1 and wherein the mole ratio of first monomer:second monomer of from about 4:3 to about 2:3;
    wherein a transition metal catalyst is complexed with a first complexing agent and the hydrogenation is conducted in the presence of said transition metal catalyst complex and a trialkylaluminum wherein the alkyl group contains from 1 to about 4 carbon atoms and further in the absence of boron trifluoride or boron trifluoride etherate; and further wherein said transition metal catalyst is deactivated after hydrogenation by the use of a second complexing agent, in the absence of air.

2. The composition of claim 1 wherein $R_1$ and $R_2$ are independently hydrogen, fluorine, —$CF_3$, —$CF_2CF_3$, —$CH_2CF_3$, or $CF_2CF_2H$.

3. The composition of claim 2 wherein said conjugated diene is butadiene or isoprene.

4. The composition of claim 3 wherein the transition metal catalyst is a cobalt or nickel salt and a trialkylaluminum is triethylaluminum.

5. The composition of claim 3 wherein the transition metal catalyst is a palladium, platinum or rhodium salt.

6. The composition of claim 4 wherein $R_1$ and $R_2$ are independently hydrogen, fluorine, or —$CF_3$.

7. The composition of claim 6 wherein X is —$COOR_4$, wherein $R_4$ is an alkyl group containing 1 carbon atom.

8. The composition of claim 7 wherein the cobalt catalyst is cobalt octoate or cobalt neodecanoate.

9. The composition of claim 8 wherein the first complexing agent is hexamethylphosphoric triamide, tetramethylethylenediamine, $(R_7)_3P$, $(R_7O)_3P$ wherein $R_7$ is an alkyl group containing from 1 to about 6 carbon atoms, a phenyl, or o-tolyl group.

10. The composition of claim 9 wherein the second complexing agent is acetic acid.

11. The composition of claim 10 wherein X is —$CONR_5R_6$, wherein $R_5$ and $R_6$ are alkyl groups containing 1 carbon atom.

12. The composition of claim 11 wherein the weight ratio of diene (a): $CH_2$=$CR_3X$ (b), when (b) is present, is from 1:7 to about 7:1.

13. The composition of claim 12 wherein the weight ratio of diene (a): $CH_2$=$CR_3X$ (b), when (b) is present, is from 4:3 to about 2:3.

14. A high temperature oil elastomer composition, comprising:
    a hydrogenated copolymer, said copolymer prepared by the copolymerization of a polar first monomer which comprises a fluorodiene of the structure

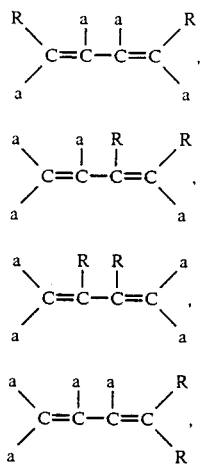

wherein substituent a is independently hydrogen or fluorine, R is hydrogen or a fluoro alkyl group containing from 1 to about 4 carbon atoms and containing at least three fluoro atoms, with the proviso that both R's are not hydrogen;
and a second monomer wherein said second monomer is (a) a conjugated diene, a branched conjugated diene, or mixtures thereof containing from 4 to 8 carbon atoms; or (b) a monomer of the general formula $CH_2=CR_3X$ wherein $R_3$ is hydrogen or an alkyl group containing from 1 to 4 carbon atoms, and X is 2-pyridyl, 4-pyridyl, $-COOR_4$, $-CONR_5R_6$ or $-COOR_7OR_4$ wherein $R_4$ is an alkyl group containing from 1 to about 4 carbon atoms, $-CH_2=CF_3$ or $-CH_2CF_2CF_2H$, $R_5$ and $R_6$ are alkyl groups containing from 1 to about 4 carbon atoms and $R_7$ is an alkylene group containing from 1 to about 4 carbon atoms; or mixtures of diene (a) and $CH_2=CR_3X$ (b), wherein the mole ratio of diene (a): $CH_2=CR_3X$ (b), when (b) is present, is from 1:7 to about 7:1 and wherein the mole ratio of first monomer:second monomer of from about 4:3 to about 2:3;
wherein a transition metal catalyst is complexed with a first complexing agent and the hydrogenation is conducted in the presence of said transition metal catalyst complex and a trialkylaluminum wherein the alkyl group contains from 1 to about 4 carbon atoms and further in the absence of boron trifluoride or boron trifluoride etherate; and further wherein and said transition metal catalyst is deactivated after hydrogenation by the use of a second complexing agent, in the absence of air.

15. The composition of claim 14 wherein said conjugated diene is butadiene or isoprene.

16. The composition of claim 15 wherein the transition metal catalyst is a cobalt or nickel salt and a trialkyl aluminum is triethylaluminum.

17. The composition of claim 15 wherein the transition metal catalyst is a palladium, platinum or rhodium salt.

18. The composition of claim 16 wherein X is $-COOR_4$, wherein $R_4$ is an alkyl group containing 1 carbon atom.

19. The composition of claim 18 wherein the cobalt catalyst is cobalt octoate or cobalt neodecanoate.

20. The composition of claim 19 wherein the first complexing agent is hexamethylphosphoric triamide, tetramethylethylenediamine, $(R_7)_3P$, $(R_7O)_3P$ wherein $R_7$ is an alkyl group containing from 1 to about 6 carbon atoms, a phenyl, or o-tolyl group.

21. The composition of claim 20 wherein the second complexing agent is acetic acid.

22. The composition of claim 21 wherein X is $-CONR_5R_6$, wherein $R_5$ and $R_6$ are alkyl groups containing 1 carbon atom.

23. The composition of claim 22 wherein the weight ratio of diene (a): $CH_2=CR_3X$ (b), when (b) is present, is from 1:7 to about 7:1.

24. The composition of claim 23 wherein the weight ratio of diene (a): $CH_2=CR_3X$ (b), when (b) is present, is from 4:3 to about 2:3.

25. The composition of claim 24 wherein substituent a is hydrogen, one R is hydrogen and one R is $CF_3$.

26. The composition of claim 25 wherein substituent a is hydrogen and R is $CF_3$.

* * * * *